A. VAN BARTH.
APPARATUS FOR HEAT TREATMENT OF METALS.
APPLICATION FILED JULY 30, 1918.

1,359,936.

Patented Nov. 23, 1920.
3 SHEETS—SHEET 1.

Witnesses
Theo Botchine
Jacob Diamond

Inventor
Arthur Van Barth

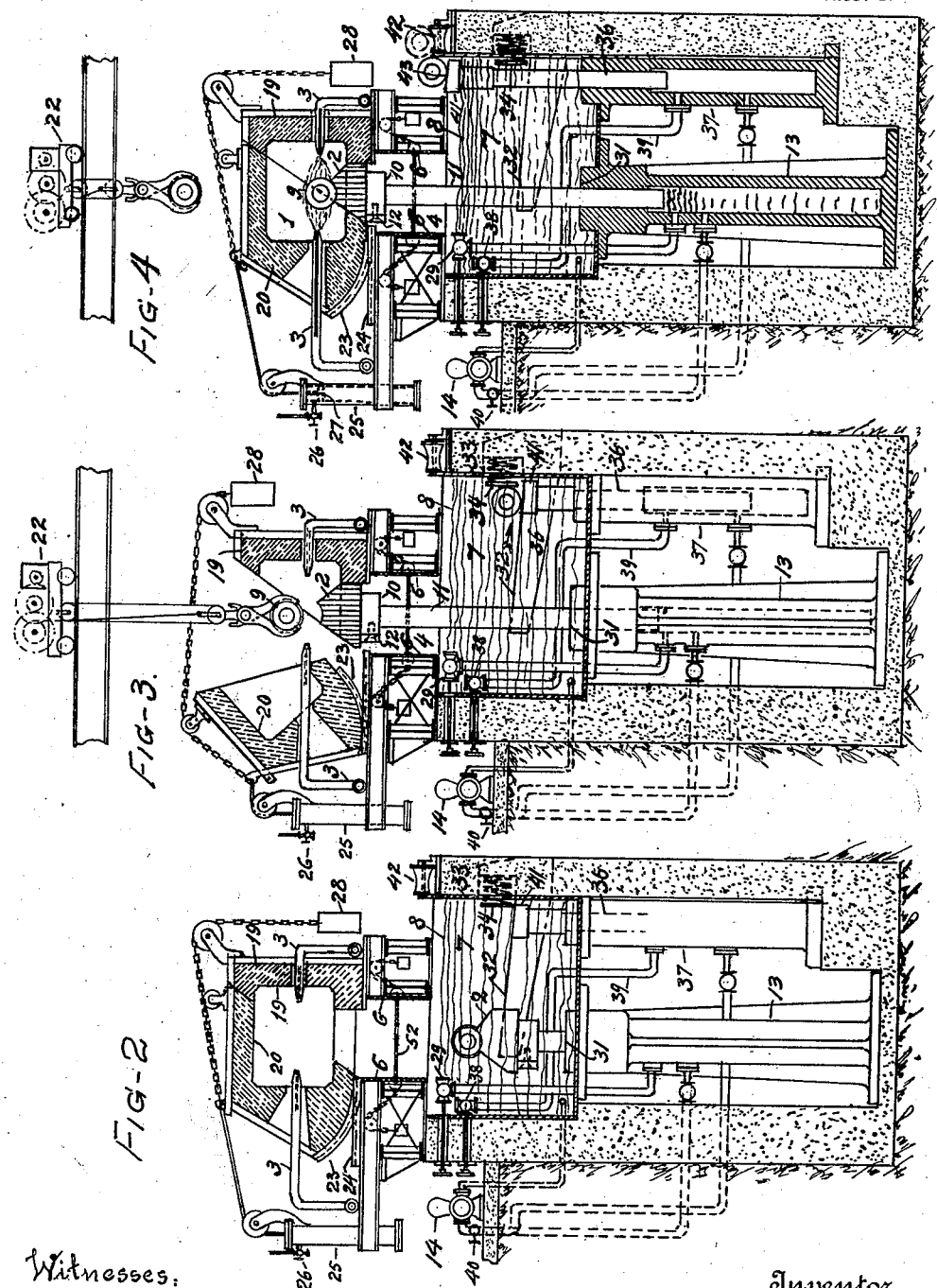

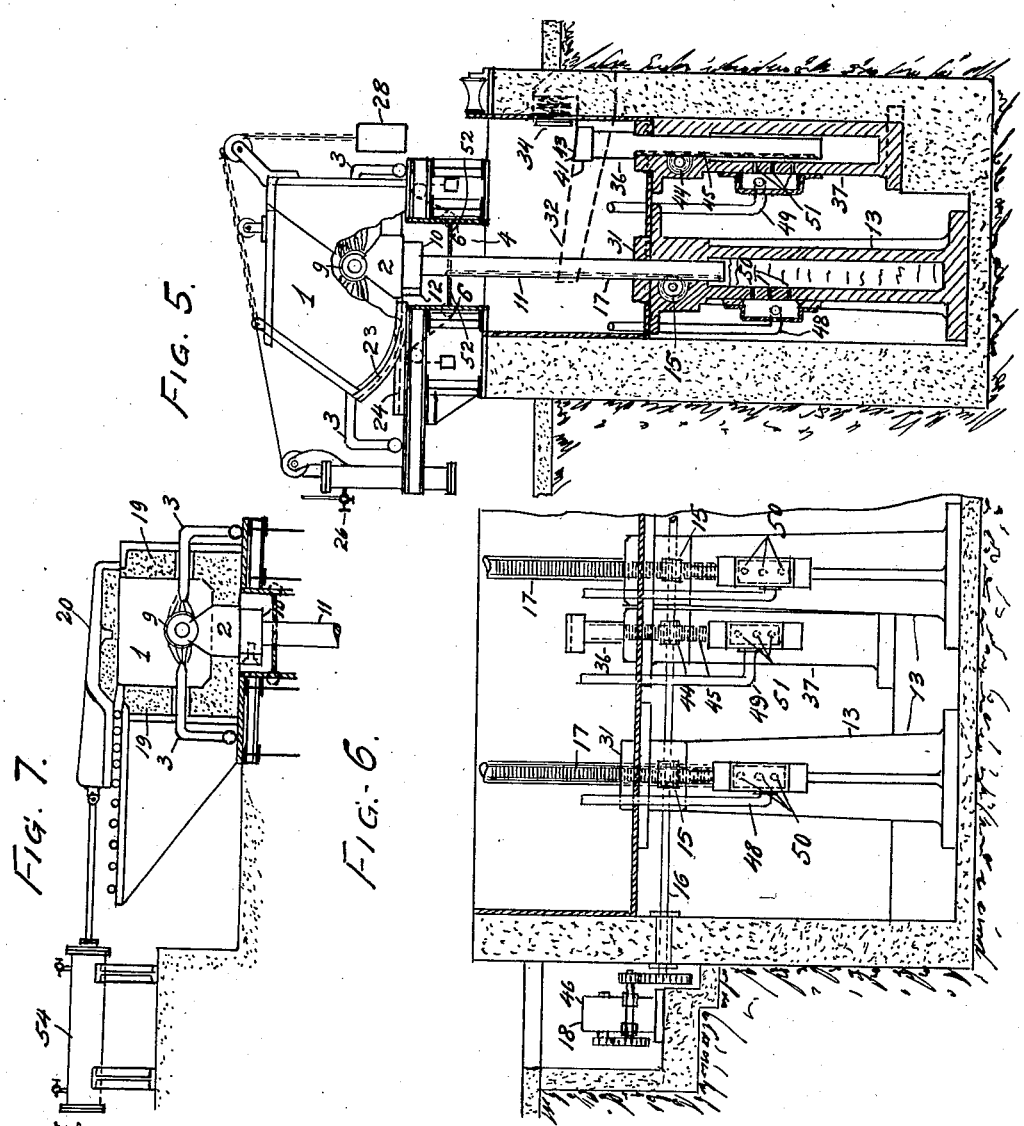

UNITED STATES PATENT OFFICE.

ARTHUR VAN BARTH, OF NEW YORK, N. Y.

HEAT TREATING APPARATUS.

1,359,936.   Specification of Letters Patent.   Patented Nov. 23, 1920.

Application filed July 30, 1918.  Serial No. 247,396.

*To all whom it may concern:*

Be it known that I, ARTHUR VAN BARTH, a citizen of United States, and a resident of the city, county, and State of New York, have invented a new and useful Heat-Treating Apparatus.

My invention relates to improvement in apparatus for the thermal treatment of metal in elongated shapes like heavy shafts, guns, etc., in which it is of great importance that the metal (steel) should acquire through a careful heat treatment a structure of high refinement and uniform quality throughout, resulting in uniform strength and homogeneity; further it is imperative that the part so heat treated should not contract unequally or become distorted. Considering all the points of requirements as to the quality of metal after the heat treatment and looking closer to the causes of the resulting sequences of heat treatment, I find that the efficiency of the thermal treatment depends largely on the manner of handling and the period of time between the heating and quenching process.

Before proceeding with the description of my invention in details and the process of heat treatment with the apparatus, I will explain the illustrations shown on the three sheets of drawings forming part of this disclosure.

Fig. 2 is a transverse vertical sectional view taken in a plane represented by the line A—A of Fig. 1, looking to the left.

Fig. 3 is a similar view taken in the same plane certain of the parts being in changed position.

Fig. 4 is another like view, of the same.

Fig. 5 is an end view, partially in section, of Fig. 6.

Fig. 6 is a fragmentary front elevational view of the tank showing a modification in construction, and Fig. 7 is a fragmentary end and sectional view of the furnace, showing a modification of the walls and furnace top.

Figure 1:
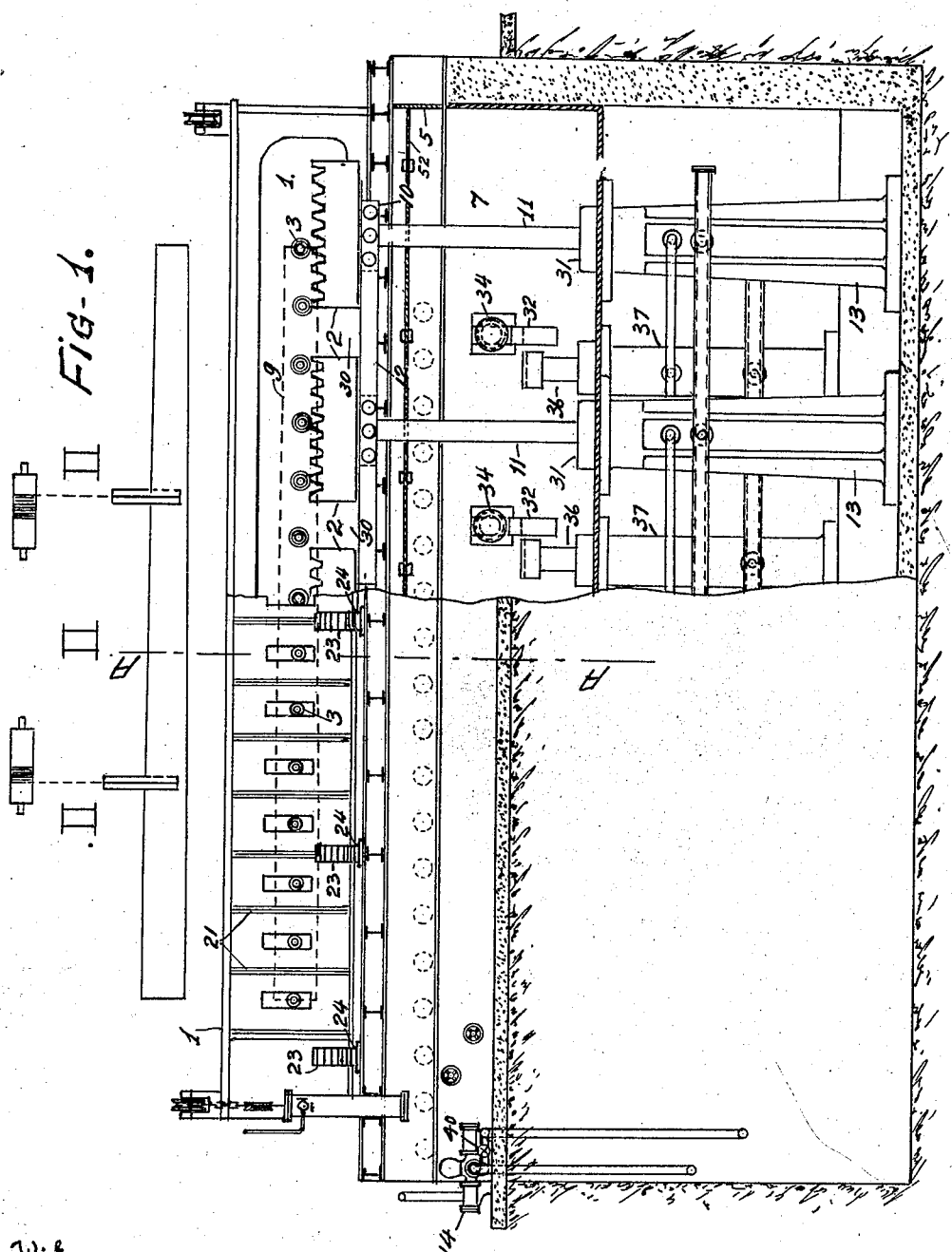
Figure 1 is a partial front elevational and partial vertical sectional view of a heat treating apparatus made in accordance with the invention.

The principal aim of my invention is to furnish an arrangement whereby the heating in a furnace of a gun or a shaft of considerable weight and length can be done in close proximity to the quenching tank with view of shortening the distance and time in handling long and heavy articles when being heated to a predetermined temperature and which must be conveyed without dissipation of heat, and bodily instantaneously immersed in the quenching fluid of the tank. The steady supports holding the body of a gun or a shaft in the interior of the furnace follow the heated body into the tank for the purpose of preventing possible deformation of the shape of the body.

Referring to the drawings in detail, the numeral 1 designates the furnace, 2 the supports for the object to be heated, and 3 the burners for either gaseous or liquid fuel, or representation of electrodes as on application of electric current for heat production. The numeral 4 indicates the vertical conduit space connecting the inside of the furnace with the inside of the quenching tank; this conduit space is inclosed from the atmosphere by the end walls 5 and side walls 6. The quenching fluid in the tank 7 is maintained at the level 8. The supports 2 for the body 9 to be heated, are made of a fire proof refractory material of suitable strength, to resist the crushing weight of the article 9. These support blocks rest on the tops 10 of each of the several plungers 11, which are rigidly connected by means of a continuous bar 12 so as to combine all the plungers into a common simultaneously acting unit. Each of these plungers is slidable in cylinders 13 and serves as pistons working under the fluid pressure furnished by a pump 14.

The furnace consists of two main parts, the stationary sides 10 and oscillating or rocking cover part 20, preferably made of cast iron held by bolts 21 and having their inner walls lined with solid refractory material appropriate for the purpose. A plurality of blocks 2 form the bottom of the furnace, these blocks being supported on the heads 10 of the plungers 11, the blocks being shaped to receive the article 9 which is introduced by an overhead trolley 22 when the cover is in a raised position, as shown in Fig. 3, and lowered upon the supporting blocks between the fixed burners or electrodes 3.

In order to provide a smooth and steady action in moving the furnace cover part 20 in opening and closing of the furnace, the same is provided at several intervals at the bottom with toothed segments which in turn mesh with toothed racks 24 extending laterally at the bottom of the furnace.

The center of gravity of the oscillating cover part 20 of the furnace is located in such a way that the cover is easily moved back and forward upon the rack while open-ing or closing the furnace.

The furnace is located directly on top of the girders, upon which rest the floor and accessory mechanism on top of quenching tank.

The cover part 20 is raised or lowered by cables actuated by pistons 27 operating in cylinders 25 adapted to receive compressed air and controlled by valves 26, the cables carrying counterweights 28 for closing the covers upon release of air from the cylinders. When the article 9 as shown in Figs. 3 and 4, is heated in the furnace to a predetermined temperature obviously under the control of a moder pyrometer, the valve is opened, connections between the fluid in the cylinders 13 and the fluid in the tank are established, then through the weight of the plunger 11 carrying the weight of the article 9 the displacement of the fluid in the cylinders begins, and descent of all the arbors holding the heated article 9 takes place. The heated article while moving downward passes the conduit 4 and entering the tank is immersed bodily into the fluid. When the plungers 11 move down before the bottom of the heads 10 of the plungers reach the top 31 of the cylinder 13, the article (a gun or a shaft) immersed is intercepted by removing bars 32, which are of rectangular shape and are adapted to pass through clearance openings 30 between the blocks 2. The article so removed by the several bars 32 located throughout the length of the tank, is forced to roll down on the inclined way of the bars, toward the wall 33 of the tank, finally striking the several buffers 34, which serve to neutralize the impact of striking developed by the momentum of rolling down of the article 9.

At the instant the support blocks 2 are relieved from the article which rolled down toward the wall 33, the valve 29 is operated, cutting off the communication between the cylinders 13 and the tank, following which, the pump 14 is set in operation pumping the fluid into all of the plunger cylinders 13, whereupon the plungers rise simultaneously replacing the support blocks 2 within the furnace, ready to receive another untreated article or work part.

In Fig. 2 is shown the plungers prior to release of the article by the bars 32, and the furnace vacant.

When the article tempered in the fluid is cooled off, the lifting of the same out of the tank and further conveyance takes place, the process of which is now to be explained. For that purpose there are installed immediately under and in front of the buffers 34, other vertical plungers 36, operating in cylinders 37, these plungers having heads 43 suited to the article 9 at that time directly over the heads.

By closing the valve, thereby cutting off the connections 39 between the fluid in the tank and the cylinders 37 and then operating the three-way valves 40 connection between the pump 14 of the cylinders is established.

Pumping the fluid into the cylinders 37, the plungers 36, carrying on their heads 41 the article to be lifted, begins to ascend. It is obvious that the article which rests on the inclined surfaces 43 of the heads 41 when it reaches the level, clearing the line of conveying rollers 42 will roll off upon the rollers and will be in position to be conveyed out of the way. The raising of the plungers 36 can also be accomplished by the arrangement shown in Figs. 5 and 6 that is by applying a pinion 44 and correspondingly toothed rack 45 driven by an electric motor 46 on a shaft 47. In this case a permanent communication between the fluid in the tank and the plunger cylinders through pipes 48 and 49 is maintained and each of the cylinders 13 and 37 are provided with several small orifices 50 and 51 through which the fluid enters on the ascent of the plungers and is discharged on their descent, acting as a brake and causing a slow movement of the loaded plungers.

In order to protect the fluid tank against the action of heat from the furnace there is installed across the conduit at the side walls 6 hinged and counter-balanced baffle plates in two halves 52 providing these plates with orifices to embrace the plungers, while in the horizontal position; these baffle plates recede when the article is lowered into the tank and close when the article passes by.

In the modification shown in Figs. 5 and 6, the plungers 11 are raised mechanically, rather than hydraulically, there being attached to them, racks 17 meshing with pinions 15, fixed on a common horizontal shaft 16, driven by the motor 18 in a manner that will be readily understood.

In Fig. 7 a sliding cover 20 is represented as mounted to move horizontally on rollers and is actuated by a piston and cylinder mechanism indicated by the numeral 54.

It is understood the foregoing description includes such changes as experience indicates and is not limitative of the invention, the principal features of which are included within the scope of the appended claims.

What I claim as new and desire to secure by Letters Patent is:

1. A heat treating apparatus comprising a horizontal furnace divided diagonally lengthwise from top to bottom near opposed corners into two longitudinal sections, one of said sections being fixed and the other movable, means for operating the movable section, fuel inlets passing through the side walls of said furnace, means in said movable section permitting it to tilt irrespective of the inlets passing therethrough, a tank below said furnace, and means passing through said tank adapted to support articles in said furnace and to convey them into said tank.

2. A heat treating apparatus comprising a horizontal furnace formed of two longitudinal sections meeting on an oblique line passing through the center of the furnace, one of said sections being rigid and the other oscillatingly mounted, means for rocking the last named section so as to open the furnace, counterbalancing means for normally closing said section, a quenching tank below said furnace, and means for raising and lowering the bottom of said furnace relative to said tank.

3. A heat treating apparatus comprising a horizontal sectional furnace including means for opening and closing, a tank below said furnace, independent bottom elements for said furnace, said elements being suited to support articles within the furnace, means for simultaneously raising and lowering said bottom elements so as to close the bottom of the furnace or submerge the articles in fluid in the tank, means for automatically removing articles from said bottom elements upon their descent, and means for the removal of the articles from said tank.

4. A heat treating apparatus comprising a horizontal sectional furnace including means for opening and closing, a tank below said furnace, vertical cylinders arranged at intervals below said tank, plungers operable in said cylinders, heads carried by said plungers, said heads being suited to receive articles to be treated and form bottom closures for said furnace, means for actuating said plungers, and means for releasing the articles from said heads when immersed in said tank.

5. A heat treating apparatus comprising a horizontal sectional furnace including means for opening and closing, a tank below said furnace, independent bottom elements for said furnace, said elements being suited to support articles within the furnace, means for raising and lowering said elements relative to said tank, arms extending rigidly into said tank into the paths of said elements, said arms being inclined downward toward their base and adapted to receive the articles treated, and means for raising the articles from said arms to the top of said tank.

6. A heat treating apparatus comprising a horizontal sectional furnace including means for opening and closing, a tank below said furnace, plungers having heads operable vertically in said tank adapted to form the bottom of said furnace and support articles to be treated, means for actuating said plungers, arms in said tank adapted to intercept the articles borne by said heads, said arms being inclined downward at their base, a second series of plungers operable adjacent the side of said tank between said arms, means for operating said second plungers whereby the articles are raised, and rollers adjacent to the upper edge of said tank receptive of the articles when delivered thereto by said second plungers.

Signed at New York city, in the county of New York and State of New York this 29th day of July, A. D. 1918.

ARTHUR VAN BARTH.

Witnesses:
R. S. RUTHERFORD,
RUTH REIN.